US011085537B2

(12) United States Patent
Kwon et al.

(10) Patent No.: US 11,085,537 B2
(45) Date of Patent: *Aug. 10, 2021

(54) GEAR SHIFTING APPARATUS FOR MULTI-SPEED TRANSMISSION FOR ELECTRIC VEHICLES

(71) Applicants: HYUNDAI MOTOR COMPANY, Seoul (KR); KIA MOTORS CORPORATION, Seoul (KR)

(72) Inventors: Sun Sung Kwon, Anyang-si (KR); Soonki Eo, Ansan-si (KR); Ma Ru Kang, Yongin-si (KR); Minho Chae, Incheon (KR); Yong Uk Shin, Suwon-si (KR); Chon Ok Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 91 days.

This patent is subject to a terminal disclaimer.

(21) Appl. No.: 16/512,774

(22) Filed: Jul. 16, 2019

(65) Prior Publication Data
US 2020/0158238 A1    May 21, 2020

(30) Foreign Application Priority Data
Nov. 19, 2018 (KR) .................. 10-2018-0142796

(51) Int. Cl.
*F16H 63/34* (2006.01)
*F16H 61/22* (2006.01)
(Continued)

(52) U.S. Cl.
CPC ........ *F16H 63/3466* (2013.01); *F16H 61/32* (2013.01); *F16H 63/3013* (2013.01);
(Continued)

(58) Field of Classification Search
CPC .............. F16H 61/32; F16H 2061/223; F16H 2061/2869; F16H 63/3013; F16H 63/3466;
(Continued)

(56) References Cited

U.S. PATENT DOCUMENTS 6,725,962 B1 * 4/2004 Fukuda ............... F16D 63/006
180/292
7,753,187 B2 * 7/2010 Fujimoto ............ F16H 63/3416
192/219.5
(Continued)

FOREIGN PATENT DOCUMENTS

GB        1268010 A  *  3/1972  ............ F16H 61/16

*Primary Examiner* — Bobby Rushing, Jr.
(74) *Attorney, Agent, or Firm* — Brinks Gilson & Lione

(57) ABSTRACT

A gear shifting apparatus for a multi-speed transmission for an electric vehicle includes a shifting unit controlling gear shifting by a torque of an actuator, and a parking unit controlling a parking state by the torque of the actuator. In particular, the actuator includes a control motor transmitting a driving torque to a first driven gear and a second driven gear through a drive gear externally gear-meshed with the driven gears, and the shifting unit includes: a shift fork slidably mounted on a fork rail and activating the gear shifting; a profile drum connected to the first driven gear externally engaged with the drive gear, and having a profile groove formed along an exterior circumference of the profile drum; and a shift lug integrally formed with the shift fork and coupled with the profile groove.

5 Claims, 4 Drawing Sheets

Figure 1:
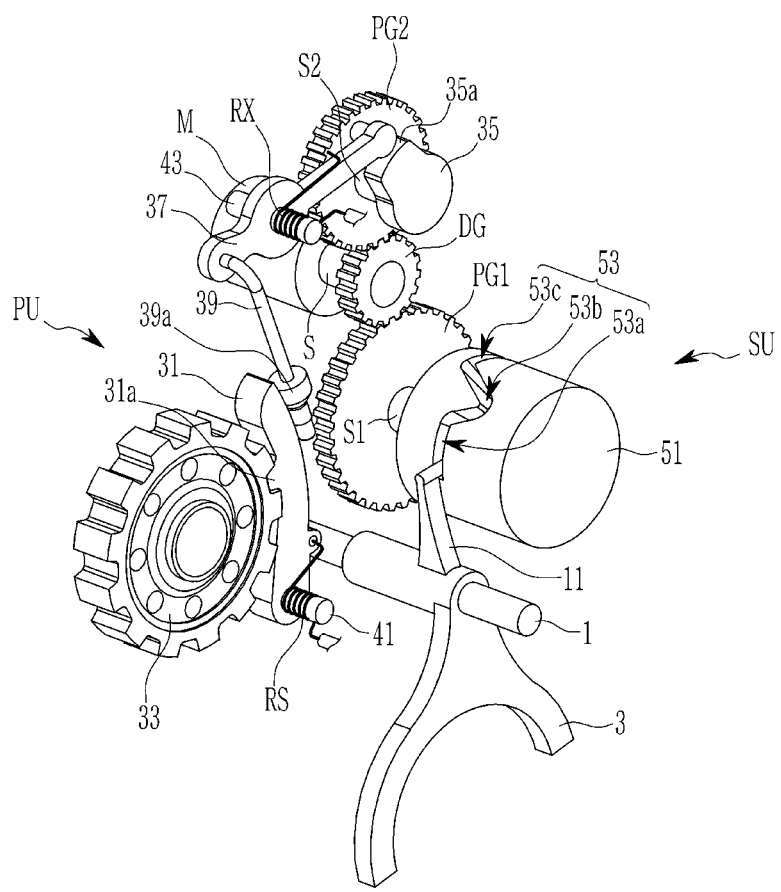

(51) Int. Cl.
   *F16H 63/30* (2006.01)
   *F16H 61/32* (2006.01)
   *F16H 63/32* (2006.01)
   *F16H 61/28* (2006.01)

(52) U.S. Cl.
   CPC ......... *F16H 63/32* (2013.01); *F16H 63/3433* (2013.01); *F16H 2061/223* (2013.01); *F16H 2061/2869* (2013.01); *F16H 2063/3083* (2013.01); *F16H 2063/321* (2013.01)

(58) Field of Classification Search
   CPC ............... F16H 63/32; F16H 2063/321; F16H 63/3425; F16H 63/3433
   See application file for complete search history.

(56) References Cited

U.S. PATENT DOCUMENTS

| | | | |
|---|---|---|---|
| 8,820,188 B2* | 9/2014 | Ho | F16D 63/006 74/473.28 |
| 9,016,154 B2* | 4/2015 | Pregnolato | F16H 63/18 74/331 |
| 9,242,623 B2 | 1/2016 | Burgardt et al. | |
| 9,518,657 B2* | 12/2016 | Kristofcsak | F16H 63/3491 |
| 2004/0261559 A1* | 12/2004 | Ozaki | F16H 61/32 74/473.12 |
| 2013/0134010 A1* | 5/2013 | Kimura | B60W 10/182 192/219.5 |
| 2014/0338484 A1* | 11/2014 | Maki | F16H 63/3441 74/337.5 |
| 2018/0328487 A1* | 11/2018 | Nishimoto | F16H 63/18 |

\* cited by examiner

GEAR SHIFTING APPARATUS FOR MULTI-SPEED TRANSMISSION FOR ELECTRIC VEHICLES

CROSS-REFERENCE TO RELATED APPLICATION

This application claims priority to and the benefit of Korean Patent Application No. 10-2018-0142796, filed on Nov. 19, 2018, the entire contents of which are incorporated herein by reference.

FIELD

The present disclosure relates to a gear shifting apparatus for multi-speed transmission for electric vehicles.

BACKGROUND

The statements in this section merely provide background information related to the present disclosure and may not constitute prior art.

An automated manual transmission (AMT), a dual clutch transmission (DCT), or a multi-speed transmission for an electric vehicle is typically employed to automatically shift gears with a gear arrangement to the gear arrangement of a conventional manual transmission. Such a transmission is typically provided with a parking actuator for an automated parking, as well as a shifting actuator to automatically shift gears.

A multi-speed transmission of an electric vehicle typically employs a shift-by-wire scheme, where shifting is electronically controlled based on driver's input signal generated by a driver's operation of a shift lever or a shift button. Since an electric vehicle may practically realize a continuously variable shifting by controlling an output power of a drive motor, shift-stages more than two shift stages are not typically required. Thus, a shifting unit installed in such an electric vehicle utilizes only one or two shift forks.

Such a multi-speed transmission of an electric vehicle employs at least one control motor as a shifting actuator for realizing the gear shifting between the available shift-stages. In addition, another control motor is separately employed as a parking actuator to control a parking sprag for engaging and releasing a parking gear.

We have discovered that the separate control motors (i.e., one control motor for a shifting unit for gear-shifting, and another control motor for a parking unit for engaging and releasing a parking gear) may cause the complicate structure of a multi-speed transmission, an increase in a production cost due to increased number of required parts, and an increase of a vehicle weight.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a gear shifting apparatus for a multi-speed transmission for an electric vehicle having advantages of realizing both the shifting function and the parking function shifting unit by a control motor, enabling control of first and second shift-stages and a parking stage, thereby realizing simplification of structure, cost reduction due to less number of required parts, and weight reduction.

A gear shifting apparatus for a multi-speed transmission for an electric vehicle may include: a shifting unit controlling gear shifting by a torque of an actuator, and a parking unit configured to change a parking state by the torque of the actuator. The actuator may include a control motor transmitting a driving torque to driven gears of the shifting unit and the parking unit through a drive gear externally gear-meshed with the driven gears. The driven gears includes a first driven gear and a second driven gear. The shifting unit may include: a shift fork slidably mounted on a fork rail and controlling a shifting synchronizer; a profile drum connected to the first driven gear externally engaged with the drive gear, and having a profile groove formed along an exterior circumference of the profile drum; and a shift lug integrally formed with the shift fork and coupled with the profile groove.

The parking unit may include: a parking gear; a parking sprag having an engagement end facing the parking gear and configured to rotate about an axis of a sprag shaft, where the parking sprag is forced toward a parking release direction by a return spring; a parking cam connected to the second driven gear externally engaged with the drive gear, and forming a cam surface on an exterior circumference; a parking lever rotatably disposed on around a lever shaft, and having an end maintaining contact with the cam surface by another return spring; and a parking rod connected to a bottom portion of the parking lever and having a cam portion interacting with an end of the parking sprag distal to the sprag shaft.

A speed reduction may be achieved when the torque of the control motor is transmitted from the drive gear to the first and second driven gears.

A reduction ratio between the drive gear and the second driven gear may be smaller than a reduction ratio between the drive gear and first driven gear.

The parking lever may rotate at an axis of the lever shaft and thereby horizontally operates the parking rod.

The cam portion of the parking rod may press the end of the parking sprag to force the engagement end of the sprag to engage with the parking gear.

The parking unit may include: a parking gear, a parking sprag having an engagement end facing the parking gear and configured to rotate about an axis of a sprag shaft, where a return spring applies an elastic force on the parking sprag toward a parking release direction; a finger drum connected to a second driven gear externally engaged with the drive gear, and having a finger end on an exterior circumference; a parking lug rotatable about a centrally positioned lever shaft and including two lug ends with different lengths from each other, where the two lug ends are configured to interact with the finger end to support or release the finger end along a rotation direction of the finger drum; and a parking rod connected to a bottom portion of the parking lug and having a cam portion interacting with an end of the parking sprag distal to the sprag shaft.

The parking lug may include a detent unit formed on the lever shaft so as to provide detent feeling during a parking operation and a parking release operation.

The detent unit may include a detent plate fixed to the lever shaft and having a groove at an end of the detent plate, and a detent pin supporting a ball to the groove.

A multi-speed transmission of an electric vehicle of an exemplary form of the present disclosure realizes both the shifting function and the parking function shifting unit by a control motor while maintaining control reliability, thereby realizing simplification of structure, a cost reduction due to decreased number of required parts, and a weight reduction.

Further areas of applicability will become apparent from the description provided herein. It should be understood that the description and specific examples are intended for purposes of illustration only and are not intended to limit the scope of the present disclosure.

DRAWINGS

Figure 2:
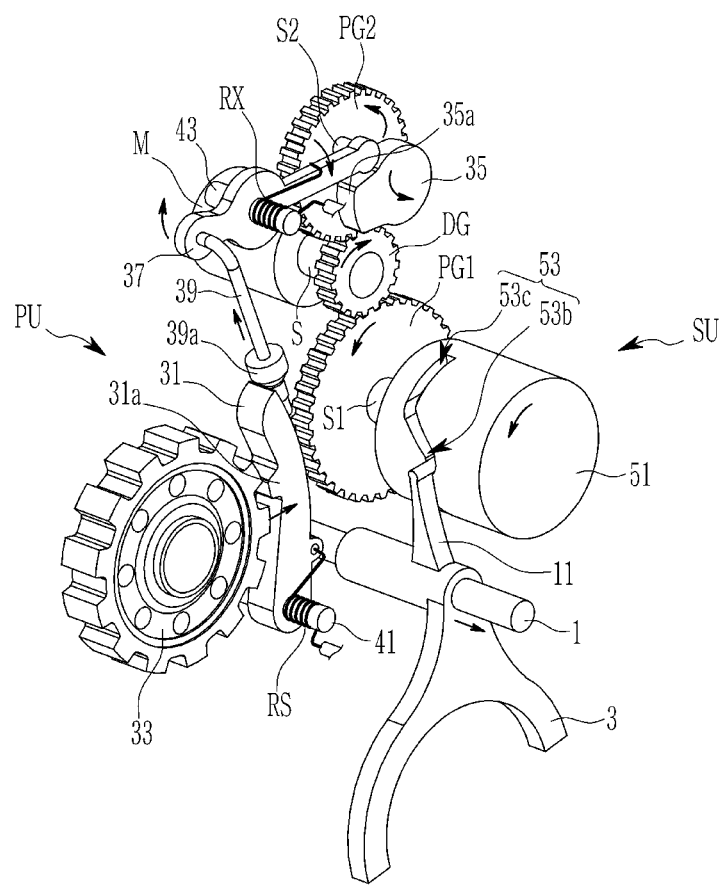
Figure 3:
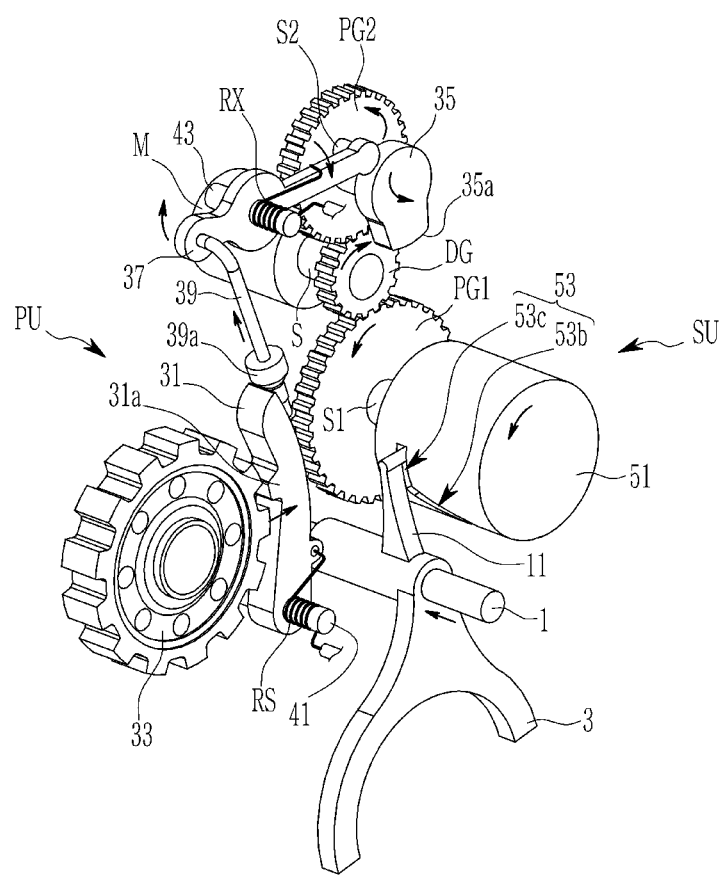
Figure 4:
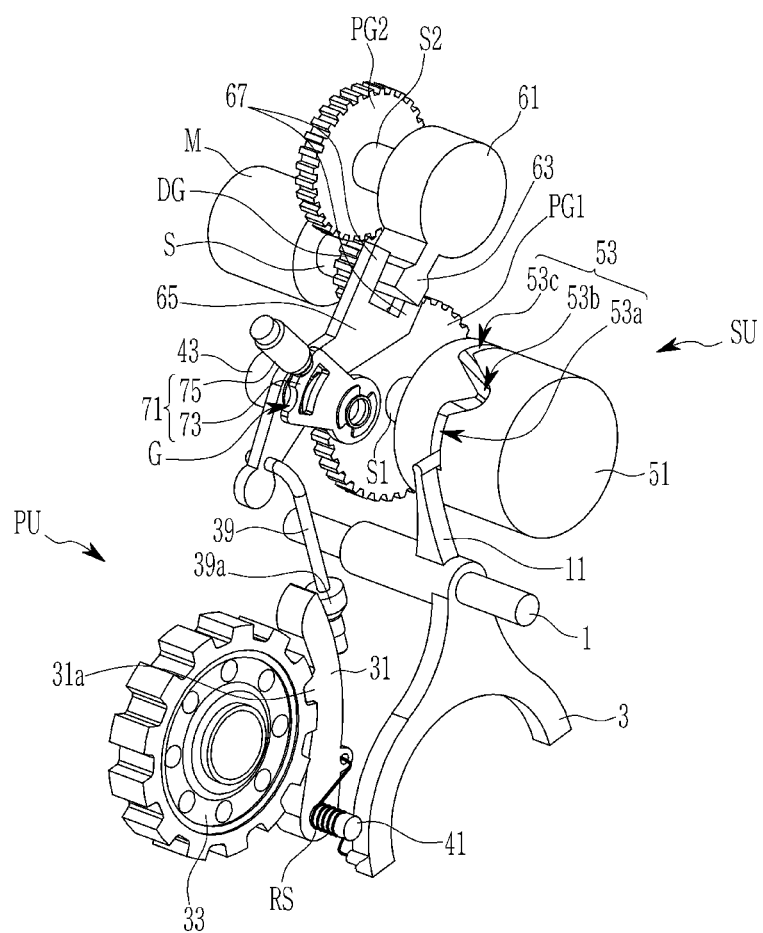

In order that the disclosure may be well understood, there will now be described various forms thereof, given by way of example, reference being made to the accompanying drawings, in which:

FIG. 1 is a schematic perspective view illustrating a parked state of a gear shifting apparatus for a multi-speed transmission for an electric vehicle according to a first exemplary form of the present disclosure;

FIG. 2 and FIG. 3 are schematic perspective views respectively illustrating first and second shift-stages of a gear shifting apparatus for a multi-speed transmission for an electric vehicle according to a first exemplary form of the present disclosure; and FIG. 4 is a schematic perspective view illustrating a parked state of a gear shifting apparatus for a multi-speed transmission for an electric vehicle according to a second exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The size and the thickness of each component illustrated in the drawings are arbitrarily illustrated in the drawings for better understanding and ease of description, but the present disclosure is not limited to the illustration. In the drawings, the thicknesses of various portions and regions are enlarged for clarity.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

For convenience of description of an exemplary form of the present disclosure, directions are described as left and right with a mere reference to FIG. 1, and may be understood that such direction is intrinsic to an actual apparatus.

FIG. 1 is a schematic perspective view illustrating a parked state of a gear shifting apparatus for a multi-speed transmission for an electric vehicle according to a first exemplary form of the present disclosure.

The gear shifting apparatus according to the first exemplary form is described with reference to an example of a two-staged transmission of an electric vehicle.

It should be noted that the gear shifting apparatus according to the first exemplary form may be applied to a transmission other than a two-staged transmission. In this case, an additional shifting unit and/or an additional control motor may be employed for further number of shift-stages.

Referring to FIG. 1, the gear shifting apparatus includes: an actuator, a shifting unit SU receiving a torque from the actuator and controlling gear shifting through a shift fork 3 installed on a fork rail 1, and a parking unit PU receiving a torque from the actuator and controlling engagement and disengagement of a parking gear 33 through a parking sprag 31.

The actuator includes a control motor M driving a drive gear DG externally gear-meshed with driven gears PG1 and PG2 of the shifting unit SU and the parking unit PU.

The shifting unit SU and the parking unit PU convert the torque of the control motor M to horizontal forces to operate of the shift fork 3 and the parking sprag 31.

The drive gear DG is mounted on a rotation shaft S of the control motor M.

In addition, the shifting unit SU includes a shift fork 3, a profile drum 51, and a shift lug 11.

The shift fork 3 is slidably mounted on the fork rail 1, and enables synchronizer operation. The shift fork 3 may be connected to the sleeve (not shown) of the synchronizer (not shown) for shifting to the first shift-stage and the second shift-stage.

The profile drum 51 is rotated by the torque of the control motor M by being connected to a first connecting shaft S1 fixed to a first driven gear PG1 externally engaged with the drive gear DG, and a profile groove 53 is formed on an exterior circumference of the profile drum 51.

Along the exterior circumference of the profile drum 51, the profile groove 53 is formed with different phases in an axial direction, which includes a neutral phase 53a for a neutral stage, a first stage phase 53b for a first shift-stage, and a second stage phase 53c for a second shift-stage, as shown in FIG. 2.

That is, the neutral phase 53a of the profile groove 53 is a portion to enable the neutral stage by activating the shift fork 3 to control a synchronizer (not shown). The first stage phase 53b of the profile groove 53 is a portion to enable the first shift-stage by activating the shift fork 3 to control a synchronizer (not shown). The second stage phase 53c of the profile groove 53 is a portion to enable the second shift-stage by activating the shift fork 3 to control a synchronizer (not shown).

The first stage phase 53b and the second stage phase 53c of the profile groove 53 are formed to the left and right of the neutral phase 53a of the profile groove 53 in an axial direction.

The drive gear DG and the first driven gear PG1 form a reduction gear ratio such that a speed reduction is realized when the torque of the control motor M is transmitted to the profile drum 51.

A bottom end of the shift lug 11 is integrally formed with the shift fork 3, and an upper end of the shift lug 11 is inserted to the profile groove 53.

While being inserted to the profile groove 53, the shift lug 11 changes positions in the axial direction by following the profile groove 53 according to the rotation of the profile drum 51, and thereby the shift fork 3 reciprocally moves to the left and right in the drawing to achieve the neutral stage and the first and second shift-stages.

The parking unit PU includes a parking gear 33 installed on an output shaft or an intermediate shaft in a transmission, a parking sprag 31, a parking cam 35, parking lever 37, and a parking rod 39.

The parking sprag 31 includes an engagement end 31a protruding from the parking sprag 31 and engaged with teeth of the parking gear 33, and disposed such that the engagement end 31a may face the parking gear 33. The parking sprag 31 is fixed to a sprag shaft 41.

A return spring RS mounted around the sprag shaft 41 always applies an elastic force on the parking sprag 31 in a parking release direction.

The parking cam 35 is rotated by the torque of the control motor M by being connected to a second connecting shaft S2 fixed to a second driven gear PG2 externally engaged with the drive gear DG, and a cam surface 35a is formed on the exterior circumference of the parking cam 35.

The cam surface 35a protrudes from the exterior circumference of the parking cam 35, and the parking gear 33 may be operated to the parked state by the protruded cam surface 35a.

That is, the cam surface 35a is for the parking stage, and exterior circumference the parking cam 35 other than the cam surface 35a is for a parking release.

The drive gear DG and the second driven gear PG2 form a reduction gear ratio such that a speed reduction is realized when the torque of the control motor M is transmitted to the parking cam 35.

Gear ratios of the drive gear DG and the first and second driven gears PG1 and PG2 are set such that a reduction ratio between the drive gear DG and the first driven gear PG1 is smaller than a reduction ratio between the drive gear DG and the second driven gear PG2.

The parking lever 37 is rotatably mounted on the lever shaft 43 fixed to the transmission housing (not shown), and maintains contact with the cam surface 35a or extra exterior circumference of the parking cam 35 by the return spring RX mounted around the lever shaft 43.

A cam portion 39a is formed on the parking rod 39 at a location corresponding to a front end of the parking sprag 31, and a rear end of the parking rod 39 is connected to a bottom end of the parking lever 37.

When the parking lever 37 rotates around an axis of the lever shaft 43, the parking rod 39 is horizontally operated. In this case, the cam portion 39a of the parking rod 39 presses an end of the parking sprag 31 that is rotatable around an axis of the sprag shaft 41, such that the engagement end 31a is engaged with the parking gear 33. The cam portion 39a is provided with a conical lateral surface to enable smooth rotation of the parking sprag 31 when the parking rod reciprocates.

FIG. 2 and FIG. 3 are schematic perspective views in first and second shift-stages of a gear shifting apparatus for a multi-speed transmission for an electric vehicle according to a first exemplary form of the present disclosure.

Hereinafter, with reference to FIG. 1 to FIG. 4, operation of a gear shifting apparatus according to a first exemplary form of the present disclosure is hereinafter described.

According to a gear shifting apparatus according to an exemplary form of the present disclosure, a control motor M controls both the shifting unit SU and the parking unit PU.

The control motor M drives the first and second driven gears PG1 and PG2 by a reduction ratio through the drive gear DG. Thereby, gear shifting is controlled through the shift fork 3 on the shift rail 1, and at the same time, engagement and disengagement of the parking gear 33 with the parking sprag 31 is also controlled.

Referring to FIG. 1, FIG. 2, and FIG. 3, an operation of the form is described with respect to the parking stage, the first shift-stage, and the second shift-stage.

[Parking Stage]

Referring to FIG. 1, in the parking stage, a top end of the parking lever 37 contacts the cam surface 35a of the parking cam 35 driven by the control motor M, by the elastic force of the return spring RX.

In this case, the parking rod 39 is located in a forward position to the parking sprag 31. In this case, the cam portion 39a of the parking rod 39 presses the end of the parking sprag 31, and the engagement end 31a of the parking sprag 31 is engaged with parking gear 33. Therefore, the parking gear 33 becomes fixed in the rotating direction, and the parked stage is achieved.

In addition, the shift lug 11 is coupled with the neutral phase 53a of the profile groove 53 of the profile drum 51, and the shift fork 3 is positioned to the neutral position, thereby achieving the neutral stage.

[First Shift-Stage]

Referring to FIG. 2, in the first shift-stage, the parking cam 35 is rotated by the control motor M. Thereby, the top end of the parking lever 37 escapes from the cam surface 35a, and moves to the exterior circumference of the parking cam 35 by the elastic force of the return spring RX, while rotating about an axis of the lever shaft 43.

In this case, the parking rod 39 moves backward from the parking sprag 31 by the rotation of the parking lever 37. Accordingly, the cam portion 39a of the parking rod 39 escapes from the parking sprag 31, and thereby the engagement of the parking gear 33 with the parking sprag 31 is released. Therefore, the parking gear 33 may freely rotate, and thereby, the parking stage is released.

At the same time, the profile drum 51 is also rotated by the control motor M, and the shift lug 11 is positioned to the first stage phase 53b of the profile groove 53 of the profile drum 51. Thereby, the shift fork 3 moves from the neutral position to the first shift-stage position in the axial direction, thereby realizing the first shift-stage.

[Second Shift-Stage]

Referring to FIG. 3, in the second shift-stage, the profile drum 51 further rotates by the control motor M from the state of the first shift-stage, and the shift lug 11 is positioned to the second stage phase 53c of the profile groove 53 of the profile drum 51. Thereby, the shift fork 3 moves from the first shift-stage position to the second shift-stage position in the axial direction, thereby realizing the second shift-stage.

While the parking cam 35 further rotates by the control motor M, the parking lever 37 maintains the contact with the exterior circumference of the parking cam 35 by the elastic force of the return spring RX, and therefore, the parking release state is maintained.

FIG. 4 is a schematic perspective view in a parked state of a gear shifting apparatus for a multi-speed transmission for an electric vehicle according to a second exemplary form of the present disclosure.

Hereinafter, a gear shifting apparatus according to a second exemplary form of the present disclosure is described in detail with reference to FIG. 4.

A gear shifting apparatus according to a second exemplary form of the present disclosure is described with reference to an example of two-staged transmission, the same as in the first exemplary form.

A gear shifting apparatus according to a second exemplary form of the present disclosure includes, the same as in the first exemplary form, an actuator, a shifting unit SU controlling gear shifting through a shift fork 3 mounted on a fork rail 1 by a torque of an actuator, and a parking unit PU receiving a torque from the actuator and controlling engagement and disengagement of a parking gear 33 through a parking sprag 31.

The actuator is the same as in the first exemplary form where a control motor M drives a drive gear DG externally gear-meshed with the driven gears PG1 and PG2 of the shifting unit SU and the parking unit PU, and the shifting unit SU and the parking unit PU convert the torque of the control motor M to horizontal forces to operate of the shift fork 3 and the parking sprag 31, the same as in the first exemplary form.

A gear shifting apparatus according to a second exemplary form of the present disclosure differs from first exemplary form only in the arrangement of the parking unit PU, and the actuator and the shifting unit SU is the same as in the first exemplary form.

The parking unit PU according to a second exemplary form of the present disclosure includes a parking gear 33 installed on an output shaft or an intermediate shaft in a transmission, a parking sprag 31, a finger drum 61, parking lug 65, and a parking rod 39.

The parking sprag 31 includes an engagement end 31a protruding from the parking sprag 31 and engaged with teeth of the parking gear 33, and the engagement end 31a may face the parking gear 33. The parking sprag 31 is fixed to a sprag shaft 41.

A return spring RS mounted around the sprag shaft 41 always applies an elastic force on the parking sprag 31 in a parking release direction.

The finger drum 61 is rotated by the torque of the control motor M by being connected to a second connecting shaft S2 fixed to a second driven gear PG2 externally engaged with the drive gear DG, and a finger end 63 is integrally formed on an exterior circumference of the parking finger drum 61.

The drive gear DG and the second driven gear PG2 form a reduction gear ratio such that a speed reduction is realized when the torque of the control motor M is transmitted to the finger drum 61.

Gear ratios of the drive gear DG and the first and second driven gears PG1 and PG2 are set such that a reduction ratio between the drive gear DG and the first driven gear PG1 is smaller than a reduction ratio between the drive gear DG and the second driven gear PG2.

The parking lug 65 includes a lever shaft 43 centrally positioned and rotatably supported by the transmission housing (not shown), and also includes lug ends 67 having different lengths to cooperate with each other so as to support or release the finger end 63 according to a rotating direction of the finger drum 61.

The parking lug 65 may include a detent unit 71 formed on the lever shaft 43 so as to provide detent feeling during a parking operation and a parking release operation.

As the detent unit 71, a detent plate 73 is fixed to the lever shaft 43, and a groove G is formed along an end of the detent plate 73. In addition, a ball having a cushion contacts the groove G, and a detent pin 75 fixed to the transmission housing (not shown) supports the ball.

A cam portion 39a is formed on the parking rod 39 at a location corresponding to a front end of the parking sprag 31, and a rear end of the parking rod 39 is connected to a bottom end of the parking lug 65.

When the parking lug 65 rotates around an axis of the lever shaft 43, the parking rod 39 is horizontally operated. In this case, the cam portion 39a of the parking rod 39 presses an end of the parking sprag 31 that is rotatable around an axis of the sprag shaft 41, such that the engagement end 31a is engaged with the parking gear 33. The cam portion 39a is provided with a conical lateral surface to enable smooth rotation of the parking sprag 31 when the parking rod reciprocates.

The parking state is formed when the finger end 63 of the finger drum 61 pushes a longer lug end 67 among the two lug ends 67 of the parking lug 65. The parking release state is formed when the finger end 63 of the finger drum 61 escape from a shorter lug end 67 among the two lug ends 67 of the parking lug 65.

As described above, a gear shifting apparatus according to a second exemplary form of the present disclosure differs from the first exemplary form only in that the finger drum 61 and the parking lug 65 are employed instead of the parking cam 35 and the parking lever 37 to operate the parking rod 39 of the parking unit PU. The shifting unit SU and the parking unit PU are controlled by the control motor M to form shifting operations between the parking stage and the first and second shift-stages, the same as in the first exemplary form.

According to a gear shifting apparatus according to a first, second exemplary form of the present disclosure, in a multi-speed transmission of an electric vehicle, actuators of the shifting unit SU and the parking unit PU is simplified as a control motor M while enabling control of first and second shift-stages and a parking stage, thereby realizing simplified structure, a cost reduction due to less number of required parts, and a weight reduction.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| M: control motor | SU: shifting unit |
| PU: parking unit | 1: fork rail |
| 3: shift fork | 11: shift lug |
| 31: parking sprag | 31a: engagement end |
| 33: parking gear | 35: parking cam |
| 37: parking lever | 39: parking rod |
| 39a: cam portion | 41: sprag shaft |
| 43: lever shaft | 51: profile drum |
| 53: profile groove | 61: finger drum |
| 63: finger end | 65: parking lug |
| 67: lug end | 71: detent unit |
| 73: detent plate | 75: detent pin |

What is claimed is:

1. A gear shifting apparatus for a multi-speed transmission for an electric vehicle, comprising:
   a shifting unit configured to control gear shifting by a torque of an actuator; and
   a parking unit configured to change a parking state by the torque of the actuator,
   wherein the actuator comprises a control motor transmitting a driving torque to driven gears of the shifting unit and the parking unit through a drive gear externally gear-meshed with the driven gears, where the driven gears include a first driven gear and a second driven gear,
   wherein the shifting unit comprises:
      a shift fork slidably mounted on a fork rail and configured to perform the gear shifting;
      a profile drum connected to the first driven gear externally engaged with the drive gear, and having a profile groove formed along an exterior circumference of the profile drum; and a shift lug integrally formed with the shift fork and coupled with the profile groove, and wherein the parking unit comprises:

a parking gear;

a parking sprag having an engagement end facing the parking gear and configured to rotate about an axis of a sprag shaft wherein a return spring forces the parking sprag toward a parking release direction;

a parking cam connected to the second driven gear externally engaged with the drive gear, and forming a cam surface on an exterior circumference thereof;

a parking lever rotatably disposed on around a lever shaft, and having an end maintaining contact with the cam surface by another return spring; and a parking rod connected to a bottom portion of the parking lever and having a cam portion interacting with an end of the parking sprag distal to the sprag shaft.

2. The gear shifting apparatus of claim 1, wherein a speed reduction is achieved when the torque of the control motor is transmitted from the drive gear to the first and second driven gears.

3. The gear shifting apparatus of claim 2, wherein a reduction ratio between the drive gear and the second driven gear is less than a reduction ratio between the drive gear and the first driven gear.

4. The gear shifting apparatus of claim 1, wherein the parking lever rotates at an axis of the lever shaft and thereby horizontally operates the parking rod.

5. The gear shifting apparatus of claim 1, wherein the cam portion of the parking rod presses the end of the parking sprag to force the engagement end of the sprag to engage with the parking gear.

* * * * *